(12) United States Patent
Sonnichsen et al.

(10) Patent No.: US 8,920,991 B2
(45) Date of Patent: Dec. 30, 2014

(54) STEPPED STEAM REFORMER

(75) Inventors: Brian Sonnichsen, Portland, OR (US); Bob Sorensen, Hillsboro, OR (US)

(73) Assignee: Doosan Fuel Cell America, Inc., Atlanta, GA (US)

( * ) Notice: Subject to any disclaimer, the term of this patent is extended or adjusted under 35 U.S.C. 154(b) by 0 days.

(21) Appl. No.: 13/353,147

(22) Filed: Jan. 18, 2012

(65) Prior Publication Data

US 2012/0141893 A1 Jun. 7, 2012

(51) Int. Cl.
*H01M 8/06* (2006.01)
*B01J 8/02* (2006.01)
*C01B 3/38* (2006.01)

(52) U.S. Cl.
CPC .............. *C01B 3/384* (2013.01); *H01M 8/0618* (2013.01); *B01J 2208/00221* (2013.01); *B01J 8/0285* (2013.01); *C01B 2203/0822* (2013.01); *B01J 2208/00212* (2013.01); *B01J 2208/00504* (2013.01); *C01B 2203/0827* (2013.01); *C01B 2203/1241* (2013.01); *B01J 8/0257* (2013.01); *C01B 2203/0283* (2013.01); *C01B 2203/066* (2013.01); *C01B 2203/0233* (2013.01); *C01B 2203/1058* (2013.01); *C01B 2203/0805* (2013.01)
USPC .......................................... 429/423; 429/162

(58) Field of Classification Search
CPC ..... H01M 8/06; H01M 8/0618; B01J 8/0257; B01J 8/0285; B01J 2208/00212; B01J 2208/00221; B01J 2208/00504; C01B 3/384; C01B 2203/0233; C01B 2203/0283; C01B 2203/066; C01B 2203/0805; C01B 2203/0822; C01B 2203/0827; C01B 2203/1058; C01B 2203/1241
USPC .................................................. 429/423, 162
See application file for complete search history.

(56) References Cited

U.S. PATENT DOCUMENTS

| | | | |
|---|---|---|---|
| 3,348,923 A * | 10/1967 | Demarest | 422/625 |
| 2005/0178063 A1* | 8/2005 | Reinke et al. | 48/198.7 |
| 2009/0087705 A1* | 4/2009 | Fuju et al. | 429/20 |
| 2010/0278700 A1* | 11/2010 | Clawson et al. | 422/198 |
| 2011/0143237 A1* | 6/2011 | Sorensen et al. | 429/423 |

* cited by examiner

*Primary Examiner* — Gary Harris
(74) *Attorney, Agent, or Firm* — Alleman Hall McCoy Russell & Tuttle LLP

(57) ABSTRACT

Embodiments are disclosed that relate to increasing heat transfer in a steam reformer. For example, one disclosed embodiment provides a steam reformer including an outer wall and an inner wall which includes a step extending outward toward the outer wall and downward toward a bottom of the steam reformer at a position between a top of the steam reformer and the bottom of the steam reformer. The steam reformer further includes a reaction chamber disposed between the outer wall and the inner wall.

20 Claims, 5 Drawing Sheets

STEPPED STEAM REFORMER

TECHNICAL FIELD

The present disclosure relates to the field of reforming, and more particularly, to a methane steam reformer for generating hydrogen for use in a fuel cell.

BACKGROUND

In a steam reformer, under high temperatures (e.g., 400-800° C.) and in the presence of a catalyst (e.g., nickel), steam may react with a feed gas (e.g., methane) to generate a reformate (e.g., hydrogen) which may be used as fuel in a hydrogen fuel cell to generate electricity, for example. Because the reforming reaction is endothermic, a heat source is needed to maintain a temperature range at which the reaction can occur.

SUMMARY

Accordingly, various embodiments are disclosed herein related to using a stepped steam reformer in order to increase heat transfer to a center of a reaction chamber and decrease a length over which the reaction is driven to completion. For example, one disclosed embodiment provides a steam reformer comprising an outer wall and an inner wall which includes a step extending outward toward the outer wall and downward toward a bottom of the steam reformer at a position between a top of the steam reformer and the bottom of the steam reformer. The steam reformer further comprises a reaction chamber disposed between the outer wall and the inner wall.

In such an example, the step reduces a width of the reaction chamber at the position between the top and bottom of the steam reformer. By reducing the width of the reaction chamber at the step, hotter feed gas flowing along the inner wall flows toward a center of the reaction chamber and mixes with colder feed gas near the center of the reaction chamber. Further, because the width of the reaction chamber remains smaller below the step, heat may be more easily conducted to the center of the reaction chamber resulting in better heat transfer to the feed gas in the reaction chamber and thus improving efficiency of the reaction and thus reducing feed gas usage. In this manner, the reforming reaction may be driven to completion for substantially all of the feed gas which enters the reaction chamber over a shorter reaction chamber length, thereby reducing an amount of materials needed for the steam reformer and a cost of the steam reformer.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The following description relates to various embodiments of a steam reformer which includes a reaction chamber with a stepped inner wall configured to conduct heat toward a center of the reaction chamber. In some embodiments, the steam reformer may further include a circular heat exchanger positioned at a top of the steam reformer. The heat exchanger may facilitate an increase in temperature of feed gas before it enters the reaction chamber, thereby increasing a rate of reaction in the reaction chamber. As described in more detail below, the steam reformer may further include an exterior shell having adjacent angled fins which are spaced from an outer wall of the reaction chamber and extend downward toward a bottom of the reaction chamber. The step of the inner wall of the reaction chamber may be positioned such that its height is aligned between a bottom of an upper angled fin and a top of a lower angled fin. As such, heat may be radiated to a portion of the reaction chamber above the step from the upper angled fin and to a portion of the reaction chamber below the step from the lower angled fin. In this manner, efficiency of the steam reformer may be further increased and a length of the reaction chamber may be further reduced. Furthermore, because the heated may be radiated toward the center of the reaction chamber, temperatures along the outer wall of the reaction chamber may be reduced, thereby decreasing degradation of the reaction chamber walls due to high temperatures.

Figure 1:
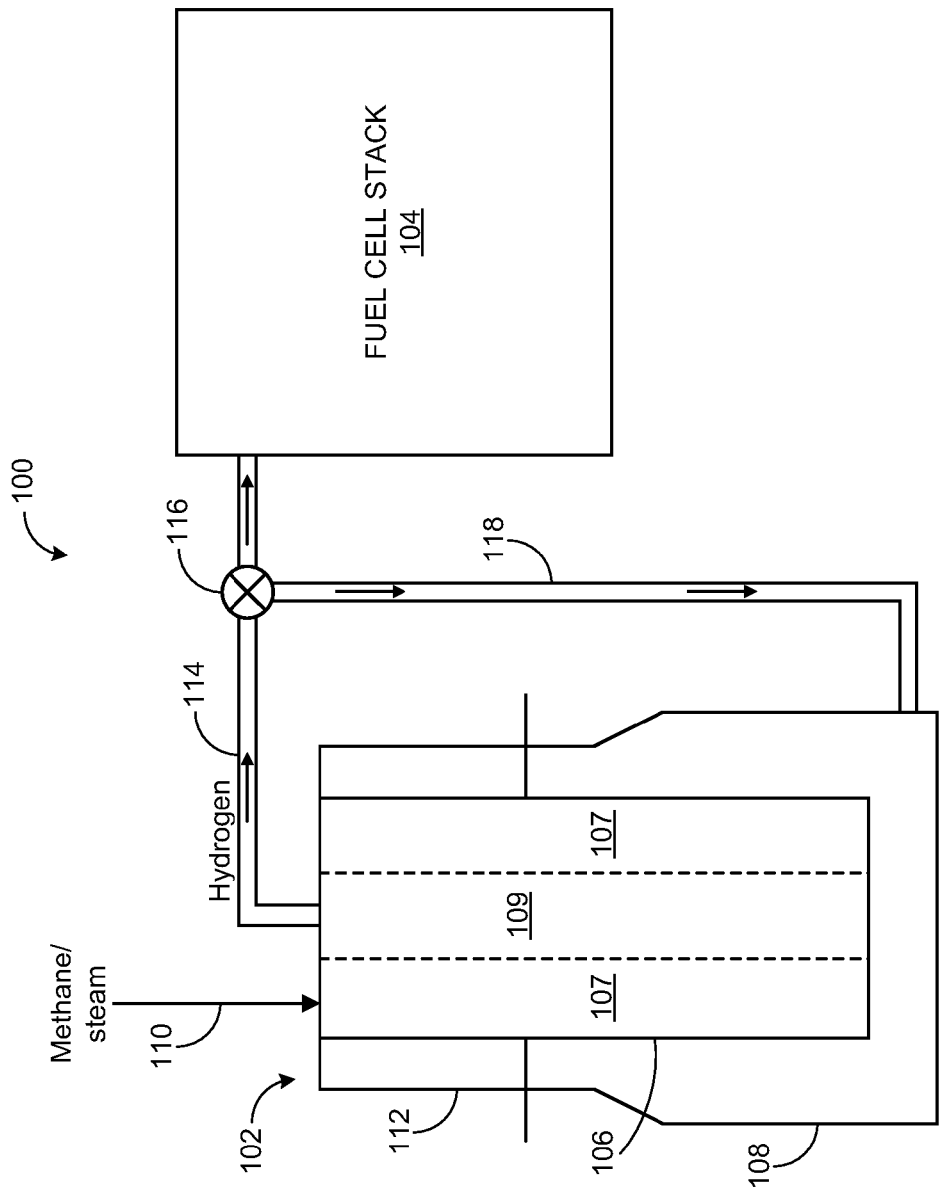
FIG. 1 shows a block diagram of a steam reforming system coupled to a fuel cell stack in accordance with an embodiment of the present disclosure.

FIG. 1 shows an example embodiment of a system 100 including a reformer 102 coupled to a fuel cell stack 104. The reformer 102 may generate a product stream (e.g., reformate) that contains hydrogen gas, for example. Hydrogen that is generated in the steam reformer 102 may be utilized, for example, by a fuel cell stack 104 to generate electrical power. The hydrogen may be further utilized to fuel a diffusion burner positioned within an exterior shell 108 which surrounds an interior reactor 106 of the reformer 102. The reformer 102 may be a steam reformer, for example, which converts a mixture of steam and a feed gas such as methane to hydrogen and carbon monoxide and/or carbon dioxide. In other embodiments, the reformer 102 may be an autothermal reformer or other reformer.

In the example embodiment of FIG. 1, the interior reactor 106 is supplied with a mixture of feed gas (e.g., methane or other suitable reactant) and water at an inlet 110. The mixture of feed gas and water may be produced in any suitable manner. For the purpose of describing operation of the reactor, the examples described herein will assume the feed gas is methane. It should be understood, however, any suitable feed gas may be used. In some embodiments, the methane/water mixture may be converted to a gaseous mixture by a vaporizer (not shown) before entering the interior reactor 106. In other embodiments, methane and water may be heated so that they are in gaseous form before they are mixed.

In some embodiments, the interior reactor 106 may have a cylindrical shape and a reaction chamber 107 of the interior reactor may have a hollow shape, such as the depicted ring shape, or other suitable shape that surrounds and conforms to the shape of the interior reactor. The reaction chamber 107 may be filled with a packing material such as a catalyst. For example, the packing material may be a metal-based catalyst such as nickel which facilitates the reaction of feed gas and steam within the reaction chamber 107. For example, in the presence of packing material and at high temperature (e.g., 750° C.), methane reacts with steam to form hydrogen and carbon monoxide via the following reversible reaction:

$$CH_4 + H_2O \leftrightarrow CO + 3H_2. \qquad (1)$$

As will be described in more detail below with reference to FIG. 3, the exterior shell 108 includes a burner, such as a diffusion burner, for heating the reactor to a temperature for the reaction to occur. As shown in FIG. 1, the exterior shell 108 surrounds a portion of the interior reactor extending from a bottom end of the interior reactor 106 partially toward a top end of the interior reactor 106 (e.g., the end where feed gas enters the interior reactor). As a non-limiting example, the exterior shell 108 may cover 60% of the outer wall when the interior reactor rests inside the exterior shell. Exhaust from combustion that occurs within a cavity formed by the exterior shell may be used to heat the feed gas/water mixture before it enters the reaction chamber 107. In some embodiments, the reformer 102 may further include a recuperator 112 which surrounds a portion of the outer wall of the interior reactor 106 extending from a top portion of the exterior shell 108 toward the top end of the interior reactor 106. The recuperator 112 may be used to heat or maintain a high temperature in the upper part of reaction chamber 107 using exhaust gas from the diffusion burner or exhaust gas from the fuel cell stack 104 to which the interior reactor 106 supplies fuel, for example. It will be understood that heat may be provided to interior reactor 106 in any other suitable manner, and that the above-described embodiment is not intended to be limiting in any manner.

Reformate (e.g., hydrogen gas) generated in the reaction chamber 107 of the interior reactor 106 exits the reaction chamber at a bottom portion of the interior reactor and travels through an inner chamber 109 before exiting the inner chamber 109 at its top end. As shown in the example of FIG. 1, hydrogen is routed from the reformer to the fuel cell stack 104 via a first pipe 114. The first pipe 114 may have a diameter in accordance with, for example, a desired amount and/or pressure of hydrogen to be supplied to the fuel cell stack 104 based on a flow rate and pressure of hydrogen generated in the interior reactor 106. The first pipe 114 may be made of any suitable material for transporting hydrogen, such as stainless steel, for example. It will be understood that the term "pipe" signifies any suitable structure for carrying gases such as a tube, a hose, a manifold, or the like.

The fuel cell stack 104 may be configured to generate power from a reaction between the supplied fuel (e.g., hydrogen) and an oxidant for driving an external load. In some embodiments, the fuel cell stack 104 may include a plurality of fuel cells that may be electrically connected to generate a higher voltage. For example, the fuel cell stack 104 may include a plurality of fuel cells electrically connected in series.

The system 100 further includes a valve 116 for regulating a supply of a fuel to the fuel cell stack 104. The valve 116 may be controlled via a controller (not shown) to route a first portion of the hydrogen generated in the interior reactor 106 to the fuel cell stack 104. The valve 116 may be further controlled to route a second portion of hydrogen to the diffusion burner (not shown) positioned within the bottom portion of the exterior shell 108 via a second pipe 118. As one example, the valve 116 may be a three-way valve. The second pipe 118 may have similar characteristics (e.g., diameter, material, etc.) as the first pipe 114, for example. It will be understood that the depicted fuel delivery system (e.g., the first and second pipes 114 and 118 and the valve 116) is shown for the purpose of example, and that any other suitable component or components may be utilized to supply hydrogen to the diffusion burner and the fuel cell stack 104. In other embodiments, the system 100 may not include valve 116. Instead, hydrogen generated in the interior reactor may be routed to the fuel cell stack, and unused hydrogen may be routed to the diffusion burner, for example.

The system 100 may form a main or auxiliary electrical power supply, such as for a business or residential building. As such, packaging constraints may exist for the system and the system may have limited packaging space. A size of a system which includes a stepped reaction chamber, which will be described in greater detail below with reference to FIGS. 2-5, may be reduced such that efficiency of the system is maintained while also meeting packaging space constraints.

Figures 2, 3:
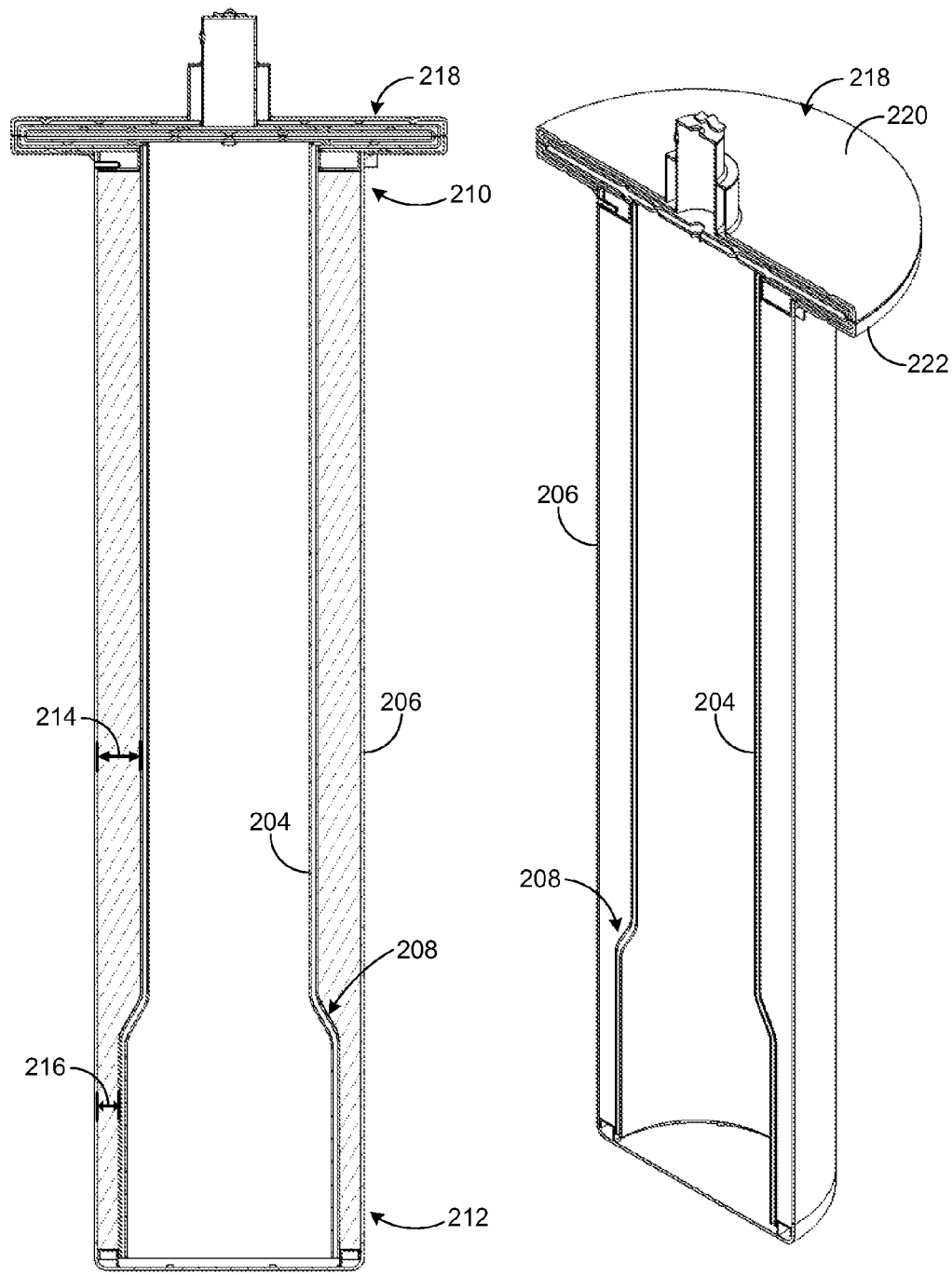
FIG. 2 shows a cross-sectional view taken along an axial direction of an example embodiment of a reaction chamber that may be used in a steam reformer.
FIG. 3 shows a perspective view of the cross-section of the reaction chamber shown in FIG. 2.

Continuing to FIGS. 2 and 3, detailed examples of an embodiment of a reaction chamber 202 which may be part of a steam reformer, such as the reaction chamber 107 described above with reference to FIG. 1, are shown. The examples shown in FIGS. 2 and 3 are drawn to scale. More specifically, FIG. 2 shows a cross-sectional view of the reaction chamber 202 along an axial direction of the reaction chamber 202. FIG. 3 shows a perspective view of the cross-section shown in FIG. 2.

As depicted in the examples of FIGS. 2 and 3, the reaction chamber 202 has an inner wall 204 and an outer wall 206. The outer wall 206 has a substantially cylindrical shape. The inner wall 204 has a substantially cylindrical shape with a tapered portion that occurs at a step 208, or ramp, in the inner wall 204, such that the reaction chamber 202 has a substantially annular shape.

As described above, the reaction chamber 202 may be filled with a packing material such as a catalyst. The packing material may be a metal-based catalyst such as platinum or nickel which facilitates the reaction of feed gas and steam within the reaction chamber 202, for example.

As shown, the step 208 is at a mid-position between a top 210 and a bottom 212 of the reaction chamber 202. Above the step 208, the reaction chamber 202 has a first thickness 214 and below the step 208, the reaction chamber 202 has a second thickness 216, where the thickness implies a distance or width between the inner wall 204 and the outer wall 206 of the reaction chamber 202. Further, in the example embodiment shown in FIGS. 2 and 3, the first thickness 214 is greater than the second thickness 216 such that an upper portion of the reaction chamber 204 is thicker than a lower portion of the reaction chamber 204.

As depicted, the step 208 is a sloped step which extends outward toward the outer wall 206 and downward toward the bottom 212 of the reaction chamber 204. As an example, a slope of the step 208 may be 30 degrees. By sloping the step downward at least slightly, hotter feed gas may more easily flow from the inner wall 204 toward a center of the reaction chamber 202 at the step 208 and mix with colder feed gas at a center of the reaction chamber 202, such that a temperature at the center of the reaction chamber 202 may be increased to drive the reforming reaction to completion at the center of the reaction chamber 202. In other examples, however, the step 208 may be a right angle stair step, a curved slope, or another suitable shape. Further, in addition to the increased mixing below the step 208, because the reaction chamber 202 is narrower below the step 208 than above the step 208, increased heat transfer may occur in the lower portion of the reaction chamber 202, thereby driving the reforming reaction to completion over a shorter distance than without the step 208. As such, a length of the reaction chamber 202 may be reduced when the inner wall 204 is stepped.

The example embodiment shown in FIGS. 2 and 3 further includes a heat exchanger 218 positioned at a top of the reaction chamber. The heat exchanger 218 is a circular, or ring-shaped, plate-plate heat exchanger, for example, having an upper plate 220 and a lower plate 222. In other examples, the heat exchanger may be another suitable compact heat exchanger which has a similar radial cross-sectional shape as that of the reformer such that it may be integrated into the reformer. In the embodiment shown in FIG. 2, the circular shape of the plates of the heat exchanger 218 creates a radial flow that causes the gasses flowing through the heat exchanger 218 to accelerate and decelerate depending on the flow direction. As such, a heat transfer rate across a common wall may be increased. For example, a change in direction as the gas flows move from flowing outward along the circular plates and then flowing inward creates turbulence which may increase heat exchange in such areas. Thus, the heat exchanger 218 allows for heat exchange between gasses entering and exiting the reaction chamber, such that a temperature of the feed gas may be increased before it enters the reaction chamber.

Figure 4:
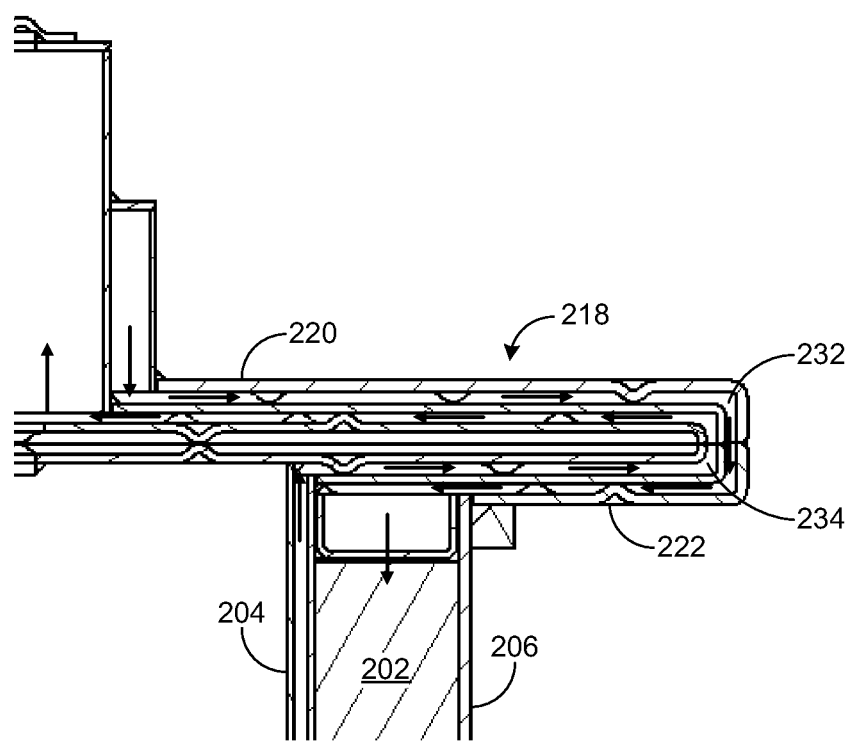
FIG. 4 shows a cross-sectional view of part of a heat exchanger positioned at a top of a steam reformer in accordance with an embodiment of the present disclosure.

FIG. 4 shows a cross-sectional view of part of the heat exchanger 218. As depicted, the heat exchanger 218 has an outer flow path 232 through which feed gas flows before it enters the reaction chamber 202. The outer flow path 232 directs the flow of feed gas radially outward and then radially inward. Reformate that leaves the reaction chamber 202 flows through an inner flow path 234 before it exits the reformer. Similar to the outer flow path 232, the inner flow path 234 directs the flow of reformate radially outward and then radially inward. A temperature of the reformate may be substantially higher than the temperature of the feed gas that enters the reaction chamber, for example. By flowing the reformate and the feed gas through the heat exchanger 218, the temperature may be increased before it enters the reaction chamber. In this manner, the reforming reaction may be driven to completion in less time and at a higher position within the reaction chamber 202 (e.g., closer to the top of the reaction chamber where the feed gas enters the reaction chamber). Further, the temperature of the exiting reformate may be reduced to a suitable temperature for subsequent reactions within a fuel processor, for example.

Figure 5:
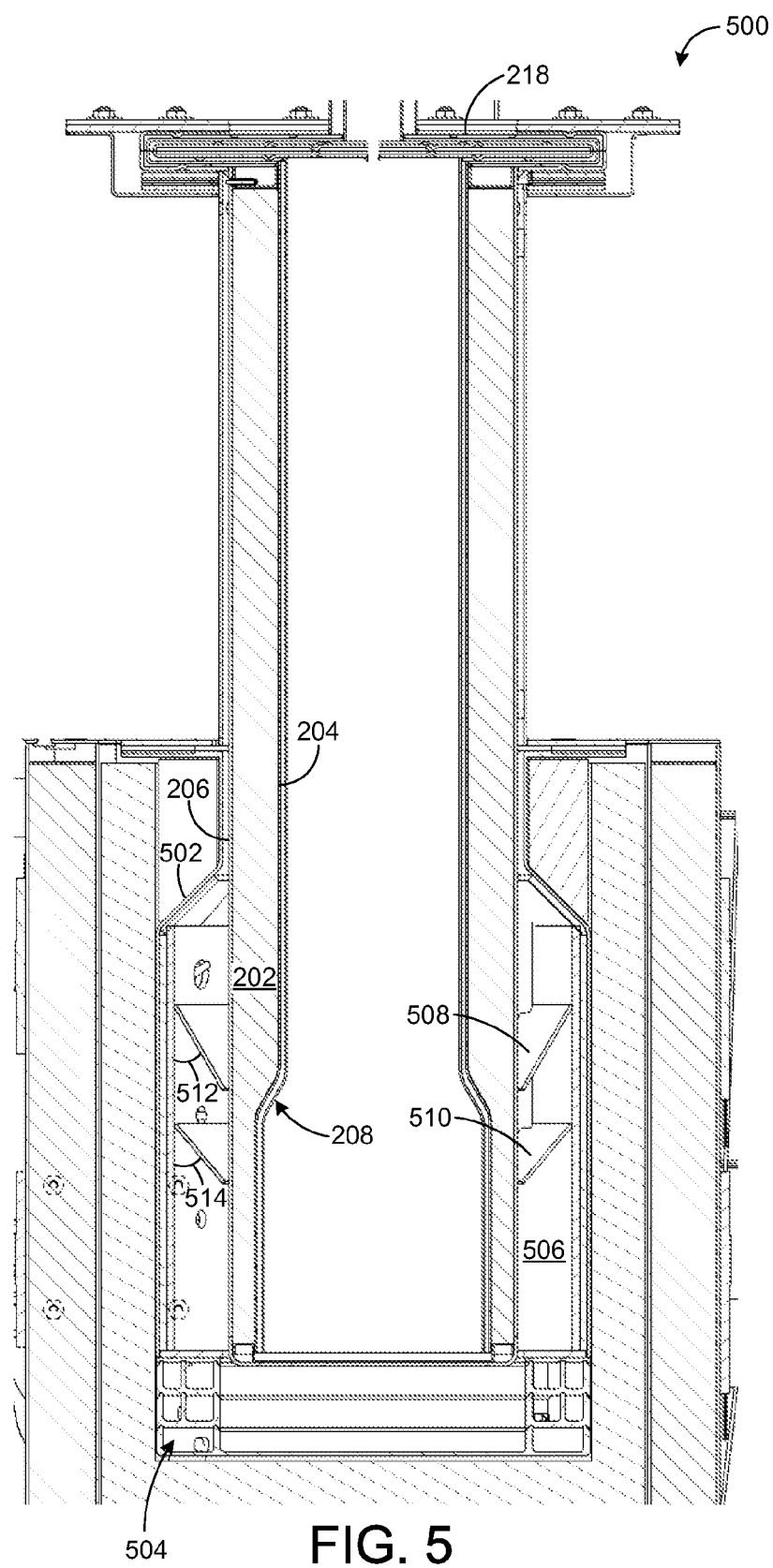
FIG. 5 shows a cross-sectional view taken along an axial direction of an example embodiment of a steam reformer.

Continuing to FIG. 5, an example embodiment of a reformer 500 which includes the reaction chamber 202 and heat exchanger 218 described above with reference to FIGS. 2-4. The example shown in FIG. 5 is drawn to scale.

As depicted in FIG. 5, the reformer 500 includes an exterior shell 502 spaced from the outer wall 204 of the reaction chamber 202. The exterior shell 502 has a cylindrical shape with a tapered portion near a top end of the exterior shell resulting in a diameter at the top end less than that of a diameter at a bottom end of the exterior shell, similar to the shape of a milk can, for example. The exterior shell 502 may be formed of any suitable material that is capable of withstanding the high temperature of burning hydrogen and insulating the interior reactor. For example, the exterior shell may be made of high nickel content stainless steel alloy.

As shown in the examples of FIG. 5, a diffusion burner 504 is positioned in a bottom portion of the exterior shell. Reformate (e.g., hydrogen) from the interior reactor may fed to the diffusion burner 504 as fuel for the diffusion burner 504, as shown in FIG. 1. In some embodiments, hydrogen and air may be mixed within the diffusion burner 504 to form an oxygenated combustible fuel stream before being routed to a cavity 506 which is formed between the exterior shell 200 and the outer wall 206 of the reaction chamber 202, for example. In other embodiments, the fuel stream may be mixed before entering the burner.

The exterior shell 502 further includes two adjacent angled fins, first angled fin 508 (the upper fin) and second angled fin 510 (the lower fin) which are shaped to conform to the exterior shell. For example, the depicted fins are ring-shaped to conform to the shape of the depicted exterior shell. In other embodiments, the exterior shell may include one angled fin or more than two angled fins. Each angled fin may extend the same radial distance from the inner surface of the exterior shell, as shown in FIG. 5. For example, the angled fins 508 and 510 may extend to a radial distance that is 90% of a distance between the inner surface of the exterior shell and an outer surface of the outer wall 206 of the reaction chamber 202. In other examples, the angled fins may extend to different radial distances across the cavity 506. Furthermore, in the example of FIG. 5, an angle 512 between the angled fin 508 and the inner surface of the exterior shell is less than an angle 514 between the angled fin 510 and the inner surface of the exterior shell. As such, a length of the upper fin 508 is greater than a length of the lower fin 510. It should be understood that FIG. 5 is merely an example, and an exterior shell may include any suitable number of angled fins.

In some embodiments, the angled fins 508 and 510 may be made of solid or perforated metal or ceramic material. In such an embodiment, the angled fins behave as baffles to the flow of the combustion gases, as combustion gases heat extraction devices, and as directed thermal radiation emitters. For example, the angled fins receive energy from the combustion gases and from any other radiating surface in the burner cavity. The fins may be solid or may contain some perforations. The solid part of the fin behaves as a baffle to impede the flow of the combustion gases and introduce recirculation to the burner chamber thereby increasing convective heat transfer. When perforations are used, the perforations in the angled fins allow for combustion gases to pass through the fins and, as the combustion gases pass through the perforations, energy is transferred convectively to the fins. This energy may then be transferred via radiation to the interior reactor. Size, shape, and location of the perforations in each angled fin may be determined such that convective heat transfer to the fins from the combustion gases is increased while the cumulative radiation heat transfer through the perforations is decreased, for example. As such, each angled fin coupled to the exterior shell may have perforations with different characteristics (e.g., perforations are larger on the bottom fin than the top fin). As an example the perforations may be round holes ⅛ inch in diameter.

Furthermore, position, length and angle of the angled fins 508 and 510 may be determined such that a desired amount of heat is radiated to a desired location of the reaction chamber 202 in order to drive a reforming reaction in the interior reactor toward the formation of more products and based on a length of the reactor, for example. As an example, the angled fins may be located near a middle region of the exterior shell 502 which corresponds to a lower region of the reaction chamber 202 where more heat may be needed due to cooling of the reformate stream from the endothermic reforming reaction. As such, the interior reactor may be heated to a desired temperature at a desired location without extending the length of the reformer. Further, because more heat is transferred to an interior of the reformer, a temperature at the outer wall 206 of the reaction chamber 202 may be reduced, thereby reducing degradation of the reaction chamber walls due to high temperatures.

As shown in the example embodiment of FIG. 5, the step 208 is positioned at a height between a bottom of the upper angled fin 508 and a top of the lower angled fin 510. In some examples, a bottom of the step 208 may be positioned at a same height as a top of the lower angled fin 510 and a top of the step 208 may positioned at a same height as a bottom of the upper angled fin 508, for example. In such a configuration, the upper fin 508, which is positioned just above the step 208, may project heat into the reaction chamber 202 in the upper portion with the greater thickness above the step 208. The lower fin 510, which is positioned just below the step 208, may project heat into the lower portion of the reaction chamber 202 in the region where warmer and colder feed gases are mixing. In this manner, increased heating of the reaction chamber 202 may occur, thereby decreasing the time to drive to the reforming reaction to completion and reducing a distance needed for the reaction to be carried out completely for all of the feed gas.

Thus, the reformer may include a stepped reaction chamber 202 surrounded by the exterior shell 502 which includes adjacent angled fins 508 and 510. By positioning the fins at a location such that the height of the step 208 is aligned between the angled fins, heat may be radiated to locations above and below the step 208 in the interior reactor 202 such that the reforming reaction occurs with a greater efficiency and over a shorter distance. Further, by including the circular plate-plate heat exchanger 218 at a top of the reformer 500, the temperature of the feed gas entering the reaction chamber 202 may be increased, further increasing the efficiency of the reformer 500. In such a configuration, by reducing the length of the reaction chamber, the overall size of the steam reformer may be reduced while maintaining system efficiency resulting in a more compact steam reforming system which meets packing constraints for reformer/fuel cell systems.

Figure 6:
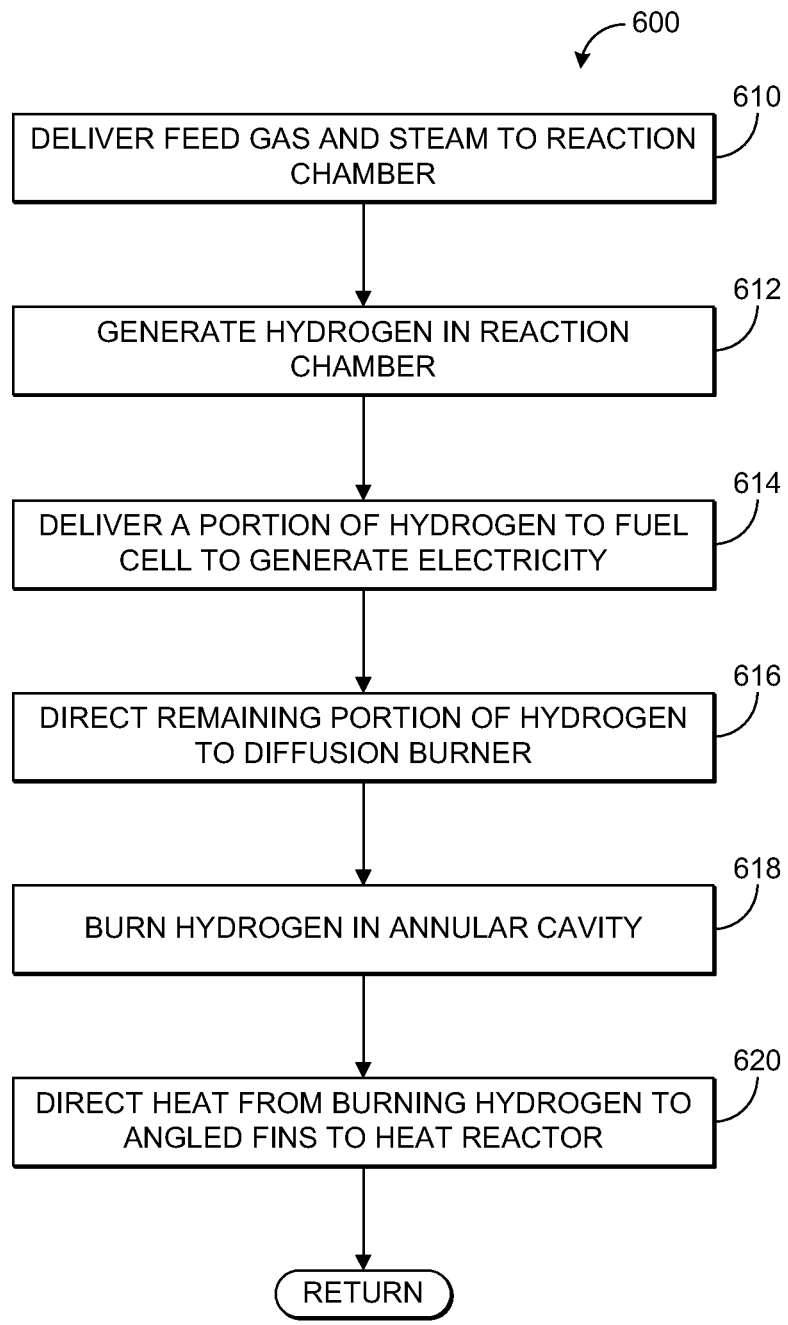
FIG. 6 shows a flow chart illustrating a method for a steam reformer coupled to a fuel cell stack in accordance with an embodiment of the present disclosure.

The flow chart in FIG. 6 illustrates an embodiment of a method 600 for a steam reformer coupled to a fuel cell stack, such as the steam reformer 102 and fuel cell stack 104 shown in FIG. 1.

At 610 of method 600, feed gas and steam are delivered to the reaction chamber. As described above, the feed gas may be methane or another suitable reactant. Hydrogen is then generated at 612 of method 600 as the feed gas travels through the reaction chamber and is converted to hydrogen in the presence of a catalyst and high temperatures.

Once hydrogen is generated, a first portion of the hydrogen is delivered to the fuel cell stack to generate electricity at 614. For example, a first pipe routes the hydrogen to the fuel cell stack and the amount of hydrogen routed to the fuel cell stack is controlled via adjustment of a valve. A second portion of hydrogen is routed to an inlet of the diffusion burner at 616 of method 600. For example, the valve may be controlled to route the second portion of hydrogen to the diffusion burner via a second valve.

Hydrogen that is routed to the diffusion burner is then burned in the cavity formed by the exterior shell at 618 of method 600. Heat from the hydrogen flames is directed toward the angled fins to heat the reactor at 620 of method 600.

Thus, an exterior shell which includes one or more angled fins may be used to increase an amount of heat transferred to a stepped reaction chamber which it surrounds while decreasing the length of the reformer compared to an exterior shell that does not have angled fins and surrounds a reaction chamber without a step. For example, the amount of heat transferred to the reaction chamber may be at least partially controlled by a position, angle, and length of each angled fin coupled to an inner surface of the exterior shell. By controlling an amount of heat transferred to the interior reactor via the angled fins, a reforming reaction which occurs within the interior reactor may be driven toward the formation of more products.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A steam reformer, comprising:
an interior reactor positioned within an exterior shell of the steam reformer;
a reaction chamber inside the interior reactor, the reaction chamber including:
an outer wall;
an inner wall which includes a sloped step extending outward toward the outer wall and downward toward a bottom of the steam reformer at a position between a top of the steam reformer and the bottom; and
an annular reaction chamber disposed between the outer wall and the inner wall, the reaction chamber including a catalyst having a thickness that decreases from a first thickness to a second thickness at the sloped step along the inner wall of the reaction chamber, the sloped step positioned between the top and the bottom of the steam reformer, and the first thickness above the second thickness.

2. The steam reformer of claim 1, further comprising:
a recuperator surrounding a portion of the reaction chamber;
a diffusion burner; and
an exterior shell spaced from the outer wall and surrounding the recuperator and the diffusion burner.

3. The steam reformer of claim 1, wherein a slope of the step is 30 degrees.

4. The steam reformer of claim 1, further comprising an exterior shell spaced from the outer wall, and wherein the exterior shell includes two angled fins which are ring-shaped and include one or more perforations, and wherein an angle between an upper of the two angled fins and the exterior shell is less than an angle between a lower of the two angled fins and the exterior shell, the annular reaction chamber contained within an interior opening of the ring-shaped fins.

5. The steam reformer of claim 4, wherein the step is positioned at a height between a bottom of the upper of the two angled fins and a top of the lower of the two angled fins.

6. The steam reformer of claim 4, wherein a bottom of the step is positioned at a same height as a top of the lower of the two angled fins and a top of the step is positioned at a same height as a bottom of the upper of the two angled fins.

7. The steam reformer of claim 1, further comprising a circular heat exchanger positioned at a top of the steam reformer and having a greater diameter than an outer wall of the reaction chamber, and wherein reformate exits the reaction chamber at the second thickness and travels through an inner chamber surrounded by the inner wall including the sloped step.

8. The steam reformer of claim 7, wherein the heat exchanger includes an outer flow path through which feed gas flows into the reaction chamber and an inner flow path through which reformate flows out of the reaction chamber.

9. The steam reformer of claim 1, further comprising a first pipe extending from the top of the steam reformer through which reformate generated in the reaction chamber is directed to a fuel cell coupled to the steam reformer.

10. A steam reformer, comprising:
an annular reaction chamber which has a thickness that decreases from a first thickness to a second thickness at a sloped step along an inner wall of the reaction chamber, the sloped step positioned between a top and a bottom of the steam reformer; and
an exterior shell which surrounds the reaction chamber and includes adjacent angled fins which extend away from an inner surface of the exterior shell and toward the bottom of the steam reformer, the reaction chamber, including the second thickness that decreases at the sloped step, fully surrounded by the adjacent angled fins.

11. The steam reformer of claim 10, wherein the first thickness is greater than the second thickness, and wherein a first fin extends above the sloped step and a second, different, fin extends below the sloped step.

12. The steam reformer of claim 10, wherein the sloped step extends toward an outer wall and the bottom of the steam reformer.

13. The steam reformer of claim 10, wherein the adjacent angled fins are ring-shaped and spaced from the reaction chamber, and wherein the adjacent angled fins include an upper angled fin and a lower angled fin.

14. The steam reformer of claim 13, wherein a top of the sloped step is aligned with a bottom of the upper angled fin and a bottom of the sloped step is aligned with a top of the lower angled fin.

15. The steam reformer of claim 10, further comprising a circular/ring-shaped heat exchanger positioned at the top of the steam reformer, the heat exchanger including an outer flow path through which feed gas flows into the reaction chamber and an inner flow path through which reformate flows out of the reaction chamber.

16. A steam reformer, comprising:
an interior reactor positioned within an exterior shell of the steam reformer;
an annular reaction chamber inside the interior reactor, the annular reaction chamber disposed between an outer wall and an inner wall and having a sloped step which extends downward toward the outer wall of the steam reformer, the sloped step positioned at a mid-position from a top of the steam reformer; and
a circular plate-plate heat exchanger positioned at the top of the steam reformer, the heat exchanger having a greater diameter than a diameter of the outer wall of the reaction chamber.

17. The steam reformer of claim 16, wherein the heat exchanger includes an outer flow path through which feed gas flows into the reaction chamber and an inner flow path through which reformate flows out of the reaction chamber.

18. The steam reformer of claim 16, wherein the exterior shell surrounds the reaction chamber and is spaced from the outer wall of the reaction chamber, the exterior shell including adjacent angled fins which extend away from an inner surface of the exterior shell and toward a bottom of the steam reformer, and wherein a height of the sloped step is between a bottom of an upper of the adjacent angled fins and a top of a lower of the adjacent angled fins.

19. The steam reformer of claim 16, further comprising a first pipe extending from a reformate outlet of the heat exchanger through which reformate generated in the reaction chamber is directed to a fuel cell coupled to the steam reformer.

20. The steam reformer of claim 19, further comprising a second pipe coupled to the first pipe via a valve, the second pipe routing a portion of the reformate to an inlet of a diffusion burner disposed in a bottom portion of an exterior shell which surrounds the reaction chamber.

* * * * *